(12) United States Patent
Bjelcevic et al.

(10) Patent No.: US 11,395,145 B2
(45) Date of Patent: Jul. 19, 2022

(54) SYSTEMS AND METHODS OF ELECTRONIC LOCK CONTROL AND AUDIT

(71) Applicant: NCR Corporation, Atlanta, GA (US)

(72) Inventors: Stefan Bjelcevic, Roswell, GA (US); Matthew Robert Burris, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 289 days.

(21) Appl. No.: 16/669,020

(22) Filed: Oct. 30, 2019

(65) Prior Publication Data

US 2021/0136580 A1 May 6, 2021

(51) Int. Cl.
*H04W 12/08* (2021.01)
*H04L 9/32* (2006.01)
*G07C 9/00* (2020.01)
*H04W 12/047* (2021.01)
*H04W 88/02* (2009.01)
*G06F 16/20* (2019.01)
*H04W 4/80* (2018.01)

(52) U.S. Cl.
CPC ........ *H04W 12/08* (2013.01); *G07C 9/00309* (2013.01); *H04L 9/3226* (2013.01); *H04L 9/3234* (2013.01); *H04W 12/047* (2021.01); *G06F 16/20* (2019.01); *G06F 2221/2101* (2013.01); *H04W 4/80* (2018.02); *H04W 88/02* (2013.01)

(58) Field of Classification Search
CPC ...... H04W 12/08; H04W 4/80; H04L 9/3234; H04L 9/0822; G07C 9/00309; G06F 2221/2101
USPC ........................................................ 713/172
See application file for complete search history.

(56) References Cited

U.S. PATENT DOCUMENTS

2004/0133653 A1\* 7/2004 Defosse .................... G07F 9/02
  709/217
2014/0375422 A1\* 12/2014 Huber ................ G07C 9/00571
  340/5.61
2021/0055902 A1\* 2/2021 Blaser .................... G09F 23/02

\* cited by examiner

*Primary Examiner* — Vernal U Brown
(74) *Attorney, Agent, or Firm* — Schwegman, Lundberg & Woessner

(57) ABSTRACT

Various embodiments herein each include at least one of systems methods, software, and data structures for electronic lock control and audit. The various embodiments, although widely applicable, are well suited for retail use where higher-value and access-controlled merchandise is stored in locked cages, closets, rooms, and cabinets to prevent theft. One method embodiment includes receiving, via a network from a mobile device app, an unlock request including an employee identifier and a lock identifier to unlock a secured resource of the lock identifier. The method proceeds in processing the request by validating the employee identifier is authorized to unlock the lock of the lock identifier at a current date and time and retrieving a key-code that will unlock the lock of the lock identifier. The method then proceeds with transmitting the key-code to the mobile device app to enable unlocking of the lock.

18 Claims, 6 Drawing Sheets

SYSTEMS AND METHODS OF ELECTRONIC LOCK CONTROL AND AUDIT

BACKGROUND INFORMATION

Retail stores use traditional physical locks and keys to secure higher-value and access-controlled merchandise such as smartphones, smartwatches, tablets, laptop computers, other electronics, perfumes, jewelry, pharmaceuticals, and the like. These keys can be stolen or duplicated very easily. Further, managing the keys can be a nuisance because whoever is in charge of the keys has to remember who they are given to and must replace the keys when they are lost. Additionally, when multiple keys are present, accountability becomes even more difficult. These difficulties contribute to the hundreds of millions of dollars of employee theft from retailer that is estimated to occur each year.

SUMMARY

Various embodiments herein each include at least one of systems methods, software, and data structures for electronic lock control and audit. The various embodiments, although widely applicable, are well suited for retail use where higher-value and access-controlled merchandise is stored in locked cages, closets, rooms, and cabinets to prevent theft.

One method embodiment includes receiving, via a network from a mobile device app, an unlock request including an employee identifier and a lock identifier to unlock a secured resource of the lock identifier. The method proceeds in processing the request by validating the employee identifier is authorized to unlock the lock of the lock identifier at a current date and time and retrieving a key-code that will unlock the lock of the lock identifier. The method then proceeds with transmitting the key-code to the mobile device app to enable unlocking of the lock.

Another method embodiment includes presenting, on a mobile device by a mobile device app, a listing of locks a validated employee is authorized to unlock and transmitting, via a network interface device of the mobile device to a backend process, an unlock request with regard to a lock of the locks the employee is authorized to unlock, This method also includes receiving an unlock code for the lock and transmitting the unlock code via a radio device of the mobile device to unlock the lock.

A further embodiment, in the form of a system, includes a network interface device, a computer processor, and a memory, storing instructions executable by the computer processor to perform data processing activities, The data processing activities, in some embodiments, include receiving, over a network via the network interface device from a mobile device app, an unlock request including an employee identifier and a lock identifier to unlock a secured resource of the lock identifier. The data processing activities then validate the employee identifier as authorized to unlock the lock of the lock identifier at a current date and time and retrieve a key-code that will unlock the lock of the lock identifier. Finally, the data processing activities of this embodiment transmit the key-code to the mobile device app.

DETAILED DESCRIPTION

Various embodiments herein each include at least one of systems methods, software, and data structures for electronic lock control and audit. The various embodiments, although widely applicable, are well suited for retail use where higher-value and access-controlled merchandise is stored in locked cages, closets, rooms, and cabinets to prevent theft. For example, such cabinets, closets, rooms, and cages typically have locks that are opened with physical keys. Some such secured storage locations may instead be secured with key combination or biometric locks. However, these solutions are often not practical in busy stores, especially during peak shopping periods such as near the holiday shopping season or at a time of release of a high-demand item. A single or limited number of key sets may be available or a person with a code or biometric authorization may not be quickly accessible. Further, even if accessible, such solutions fail to provide a reliable, trusted audit trail of when and who opened the secured storage.

Figure 1:
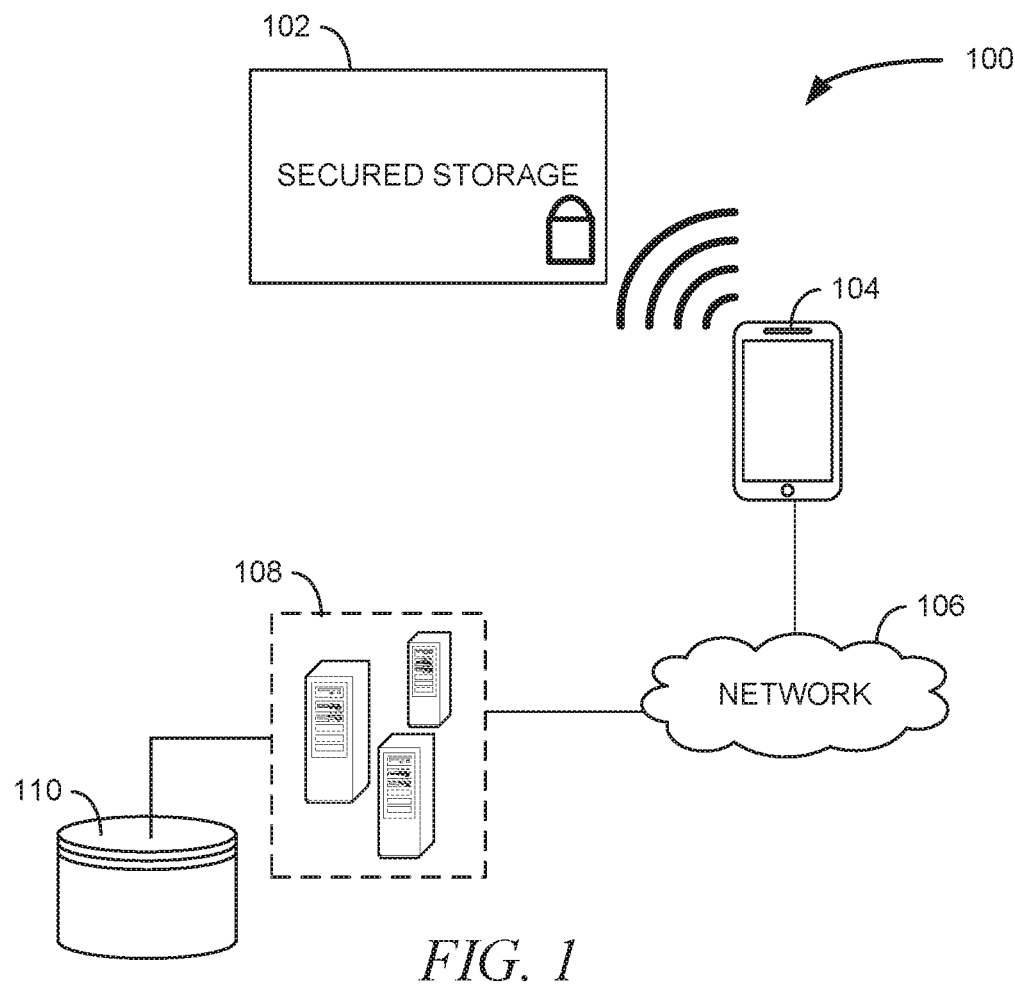
FIG. 1 is a logical block diagram of a system, according to an example embodiment.

The embodiments of the present subject matter provide a replacement for such lock and key solutions, for example in FIG. 1. FIG. 1 is a logical block diagram of a system 100, according to an example embodiment that includes a mobile device 104 and a backend system 108 that communicate over a network 106 to control access to a secured storage bin 102. Some such embodiments include a mobile device app that is deployed to employee-carried mobile devices, such as mobile device 104. The mobile device app operates to validate an identity of an employee and a permission to open the secured storage bin 102 based on factors such as role, a current time and date in view of a work schedule, store opening and closure times, and other factors.

When the employee identity and permission are validated within the app on the mobile device 104, an option to unlock a storage bin may be presented. When the unlock option is selected in some embodiments, the app may cause the mobile device 104 to send a radio signal from the mobile device 104, such as via a near field communication (NFC) device, a BLUETOOTH® transceiver, WI-FI® network interface device, or other wireless, or even wired, communication device to a networked lock device on the secured storage bin 102. Other relevant standards of the radio device in various embodiments may include ZIGBEE®, Z-WAVE®, LORAWAN®, and the like.

At various points, in the above embodiments, data is written to an audit trail, such as may be stored by a server in a database 110, other server, or other location. For example, when an employee attempts to unlock the secured storage bin 102, a result of the attempt, and issuance of an unlock command either over a network or from a radio device of the mobile device 104. These audit trail entries may be made by one or more of the mobile device app, a backend system executing on the server 108 that processes unlock requests, and the lock on the secured storage bin 102.

As such, in some embodiments, employee identity validation data is provided on the mobile device 104, such as a user name/password pair, a biometric input, and other identity validation input. The employee identity validation may be processed on the mobile device 104 by a platform identity validation process, by a mobile device app validation process, or by an identity validation process on the server 110.

In addition to identity validation, additional validation may also be implemented in various embodiments. For example, one or more of a role, shift, and permission of the employee may be validated with regard to authorization to unlock one or more secured storage bins 102. When authorized, an option for unlocking one or more secured storage bins 102 may be transmitted back to the mobile device app such that an option to unlock one or more secured storage bins 102 may be presented. In other embodiments, an option to unlock one or more secured storage bins is presented in the mobile device app and one or more of the validations may be performed upon receipt of an input selecting a secured storage bin 102 to unlock.

Regardless of when the validation is performed, at multiple points in the processing, entries are made in an audit trail to enable tracking of who is requesting access to which storage bin and when. The audit trail may simply be tracked in a backend system, stored in a backend system, or both. However, the audit trail in some embodiments may be a blockchain ledger, which may also be replicated, that may be written to by any number of participating devices and processes in the various electronic lock control and audit embodiments.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 2:
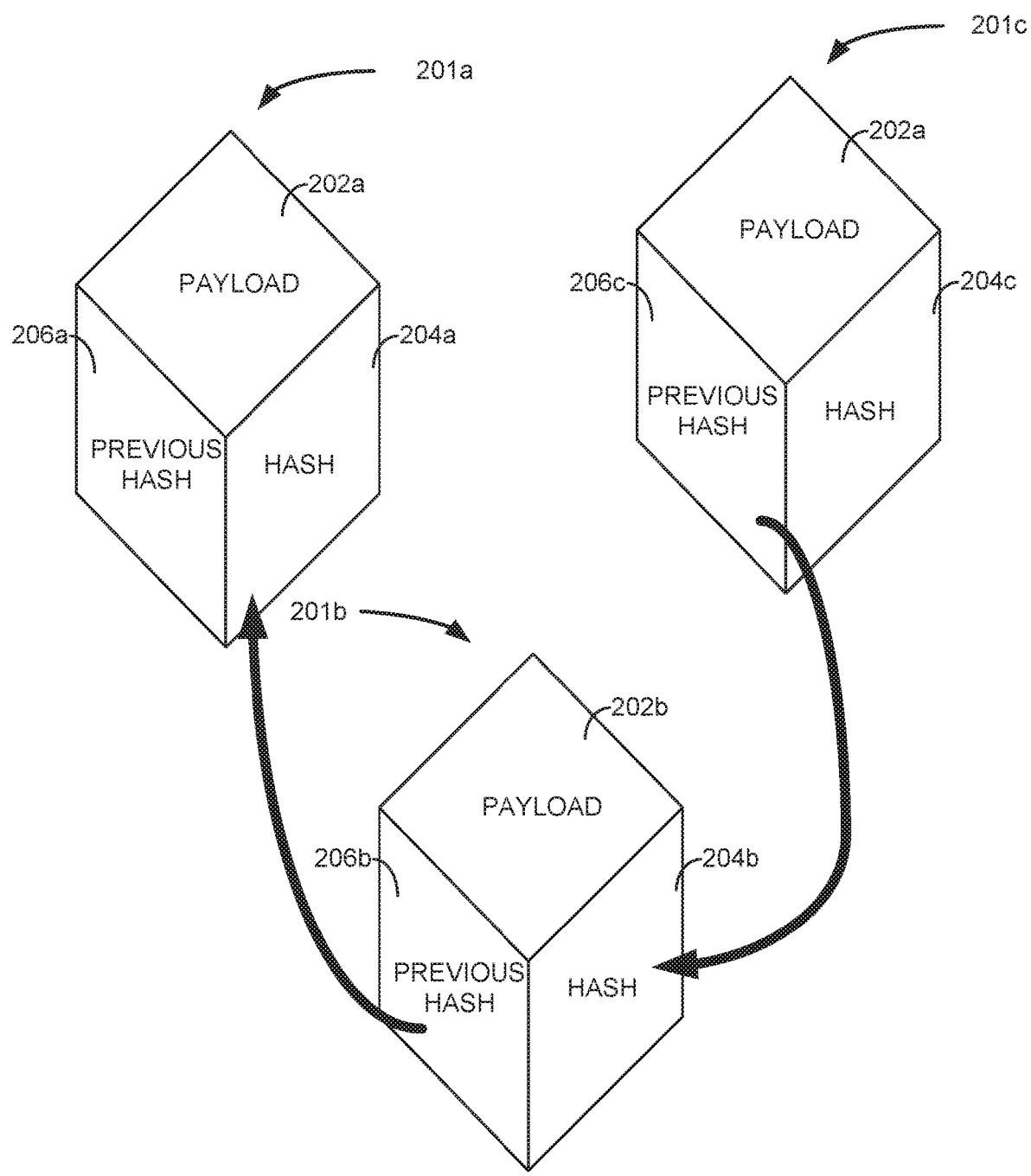
FIG. 2 is a logical diagram of data structures, according to an example embodiment.

FIG. 2 is a logical diagram of data structures 201a, 201b, 201c, according to an example embodiment. The data structures 201a, 201b, 201c are examples of audit trail entries, such as may be generated and maintained in a blockchain audit trail of some embodiments. As illustrated, the data structures 201a, 201b, 201c are blocks in a blockchain. However, in some other embodiments the data structures 201a, 201b, 201c are represented in the blockchain, such as in a ledger, only by reference by a hash value or other representation. In such embodiments, one or more other data structures stored separately may contain the underlying data, such as in a digital wallet-type structure or other storage mechanism, and that audit trail data can be verified as authentic through the data that is stored in the blockchain, such as with hash values.

The data structures 201a, 201b, 201c are each generated upon an event with regard to a secured storage bin, such as the secured storage bin 102 of FIG. 1. Such events may include unlock requests and approvals and disapprovals of such requests. Other events may be included in some embodiments, such as restocking events, product removal and stocking events based on data received from a user or by items sensed as present within a storage bin by a radio frequency identification reader of a smart device deployed with the particular secured storage bin. Other events may also be included in some embodiments dependent on the particulars thereof.

The data structures 201a, 201b, 201c are built on a blockchain platform. Thus, generally speaking, the data structures 201a, 201b, 201c each include event data as a data payload 202a, 202b, 202c. The event data may include data identifying an employee associated with the event, an identifier of an event type although this may be assumed or implied in some embodiments where is only one type of request and approval and denial thereof is specified, and the like. The data structures also include a hash value 204a, 204b, 204c that is generated from the data of the data payload 202a, 202b, 202c of the receptive data structure. The data structures 201a, 201b, 201c also include a pointer to a previous data structure, such as data structure 201c pointer 206c pointing to the hash 204b of prior data structure 201b. A sequence of the data structures 201a, 201b, 201c adds to the verifiable trust of the solution as it aids in abilities to detect tampering. Further, each data structure 201a, 201b, 201c includes a representation in a ledger that may be stored and updated in one or more locations. The ledger in such embodiments includes hash values and sequencing data that may be utilized to verify data of the data structures 201a, 201b, 201c.

Figure 3:
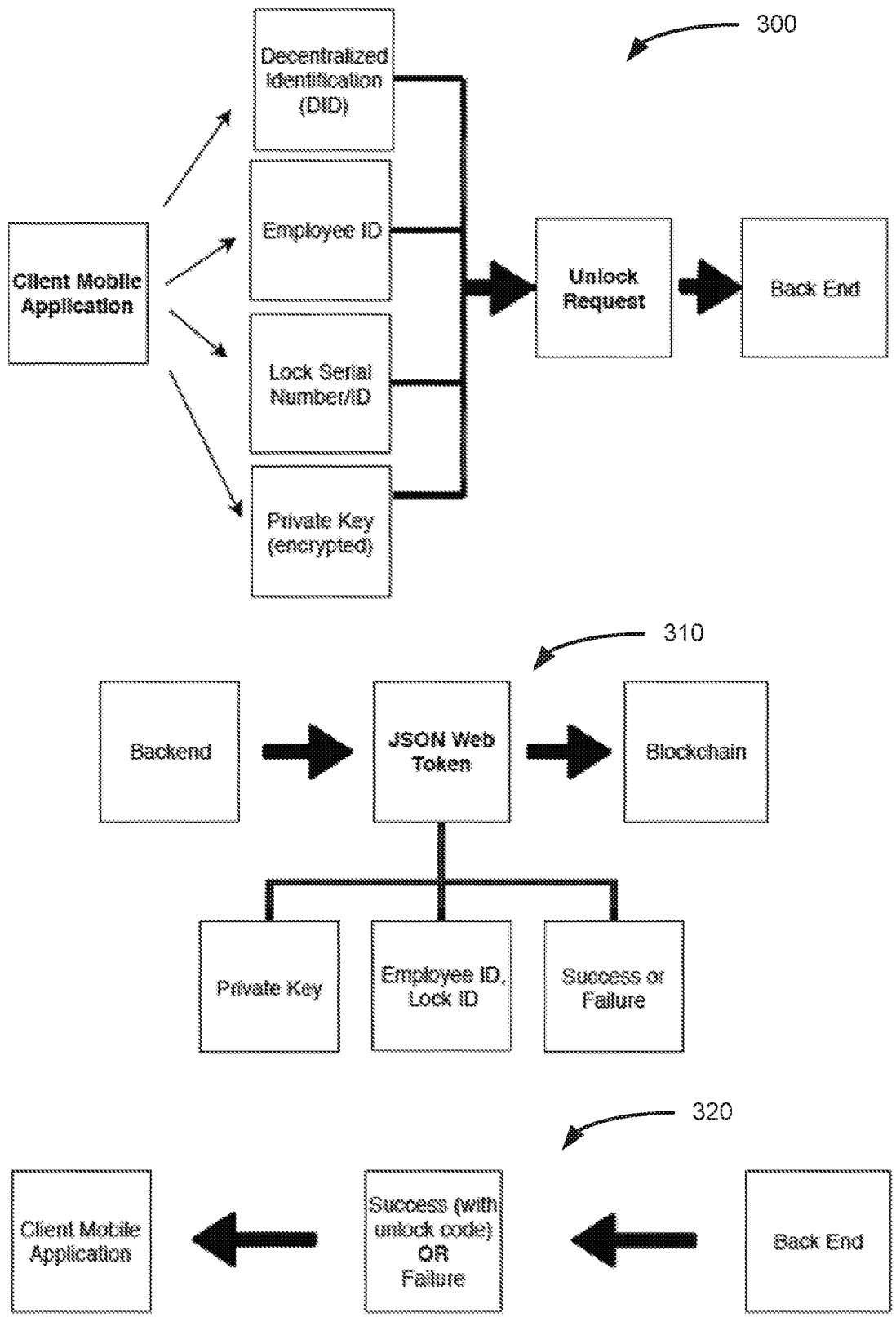
FIG. 3 is a flow diagram of data elements between system entities, according to an example embodiment.

FIG. 3 is a flow diagram of data elements between system entities, according to an example embodiment. In particular, FIG. 3 includes three illustrations including illustration 300 of a client mobile application building an unlock request, illustration 310 of backend processing of an unlock request and writing to a blockchain audit trail, and illustration 320 of the backend system sending a response to an unlock request back to the client mobile application. The data items identified in these illustrations 300, 310, 320 are in accord with sonic embodiments. Some embodiments may include more data items and others fewer.

Figure 4:
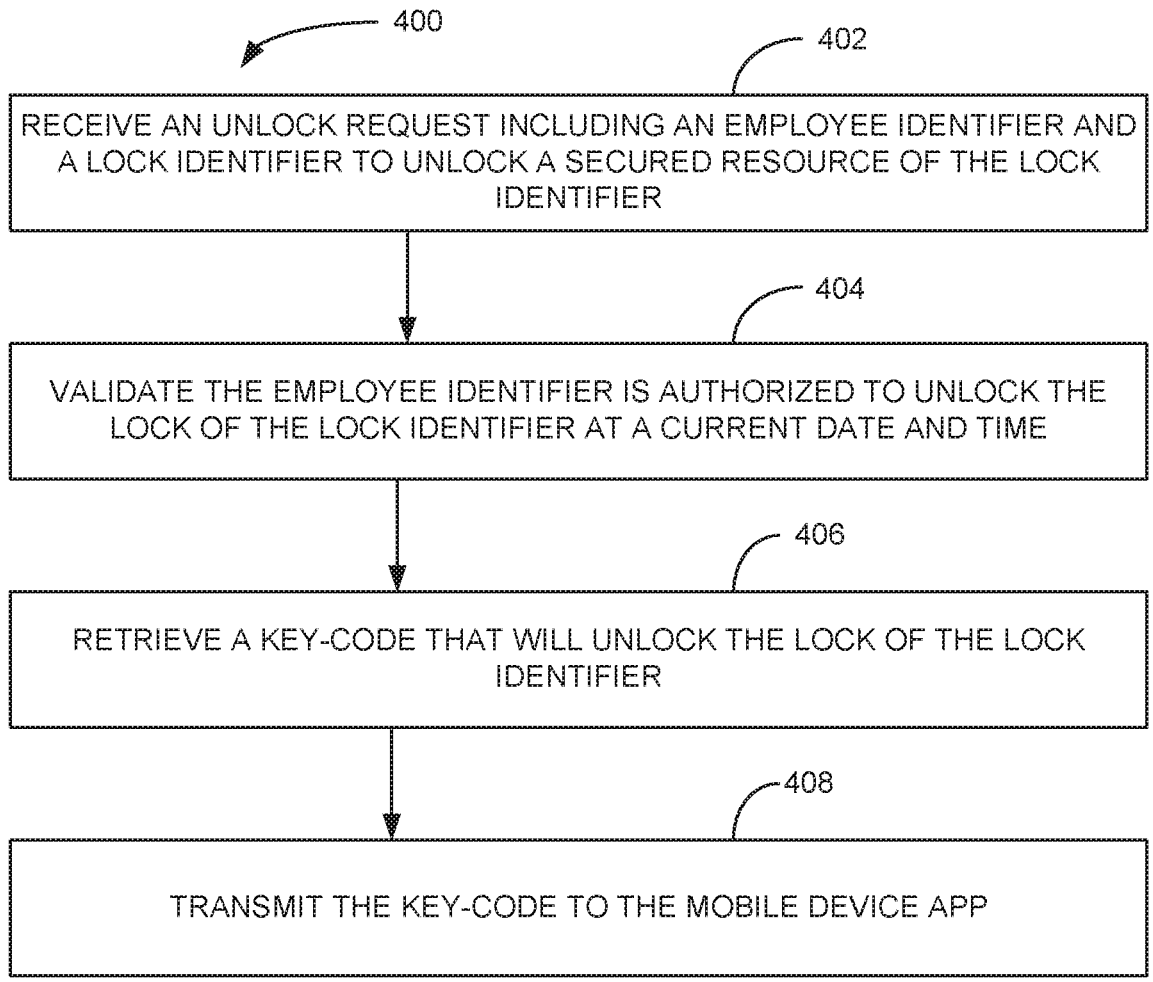
FIG. 4 is a block flow diagram of a method, according to an example embodiment.

FIG. 4 is a block flow diagram of a method 400, according to an example embodiment. The method 400 is an example of a data processing that may be performed on a backend system, such as server 108 of FIG. 1, in some embodiments. The method 400 includes receiving 402, via a network from a mobile device app, an unlock request including an employee identifier and a lock identifier to unlock a secured resource of the lock identifier, such as the secured storage bin 102 of FIG. 1. The method 400 further includes validating 404 the employee identifier is authorized to unlock the lock of the lock identifier at a current date and time. This may include querying employee data based on the employee identifier, such as employee scheduling data, employee role, position, and permission data, and the like. In some embodiments, the validating 404 may include calling a web service or other network accessible process to perform some or all of the validation 404 processing.

The method 400 also includes, when the employee is successfully validated 404, retrieving 406 a key-code that will unlock the lock of the lock identifier and transmitting 408 the key-code to enable unlocking of the lock of the lock identifier, such as to the mobile device app or directly to the lock when the lock is accessible via a network. The mobile device app, when in possession of the key-code, can provide the key-code to the lock on secured-storage bin to unlock it. In some embodiments, the key-code is a one-time use code, active only for a limited duration, or otherwise limited in use.

The lock identifier of the method 400 typically corresponds to a lock on the secured resource, such as the secured storage bin. The lock in some embodiments includes a radio device operable to wirelessly receive the key-code from a mobile device on which the mobile device app executes and unlock the secured resource upon validating the received key-code.

In some embodiments, the unlock request includes a decentralized identifier (DID) of the mobile device app, the employee identifier, the lock identifier, and an encrypted private key. Some such embodiments further include retrieving the key-code only when the employee identifier is validated to unlock the lock of the identifier at the current date and time. Some embodiments may include further conditions that are to be satisfied prior to retrieving the key-code, such as confirming the DM is associated in with the employee identifier in stored data and the private key is successfully decrypted.

In a further embodiment, upon receipt 402 of the unlock request, the method 400 may transmit a representation of the request to an audit trail process over the network and receive a token in. Further, upon validating the employee identifier is authorized to unlock the lock of the lock identifier at a current date and time, the method 400 may include transmitting a representation of the validation and the token to the audit trail process. The token in such embodiments is used for associating the result of the validation to an audit trail entry of the unlock request. As such, the audit trail in such embodiments can provide continuity through the data. processing.

Figure 5:
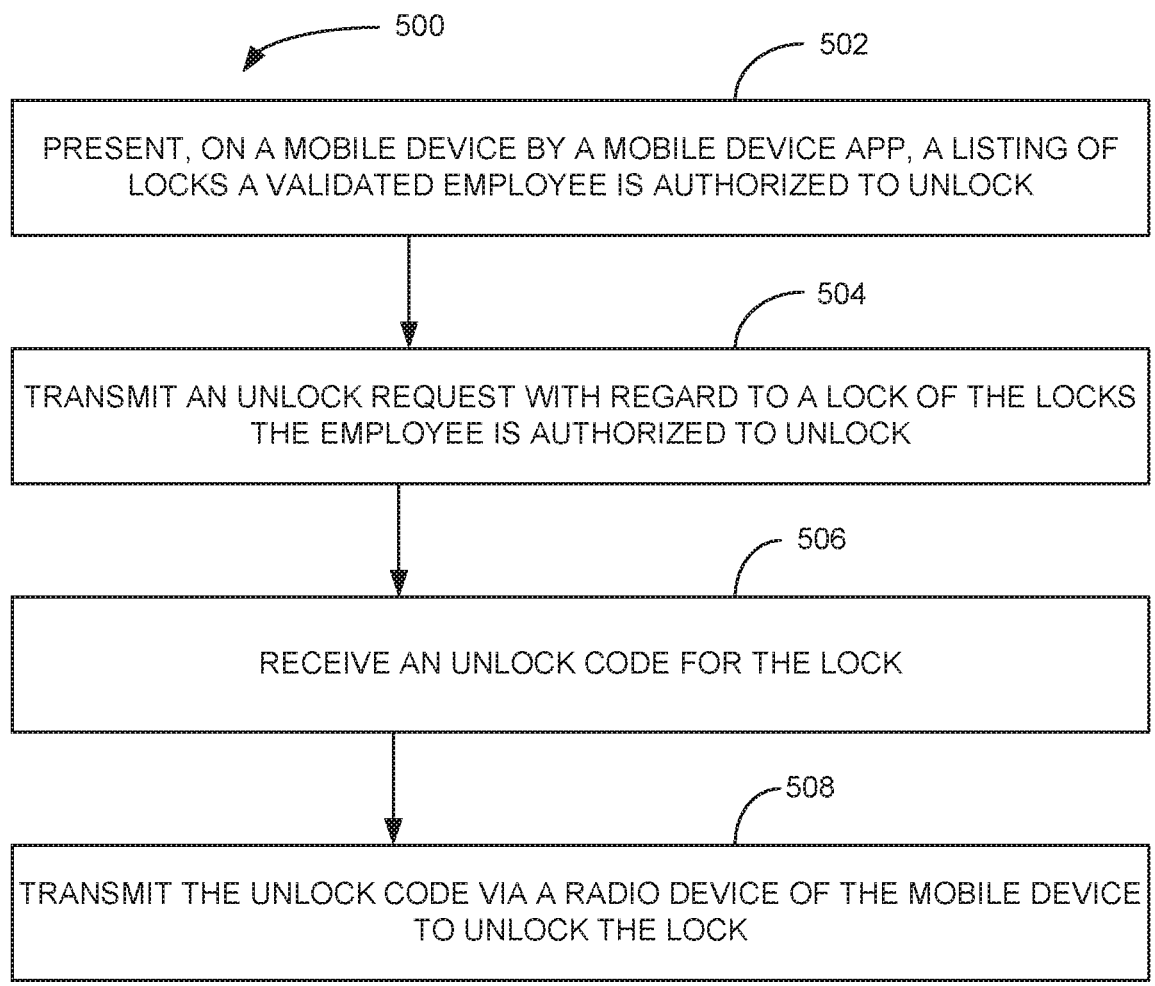
FIG. 5 is a block flow diagram of a method, according to an example embodiment.

FIG. 5 is a block flow diagram of a method 500, according to an example embodiment. The method 500 is an example of data processing that may be performed on a mobile device, such as mobile device 104 of FIG. 1, in some embodiments.

The method 500 includes presenting 502, on a mobile device by a mobile device app, a listing of locks a validated employee is authorized to unlock and transmitting 504, via a network interface device of the mobile device to a backend process, an unlock request with regard to a lock of the locks the employee is authorized to unlock. The method 500 further includes receiving 506 an unlock code for the lock and transmitting 508 the unlock code via a radio device of the mobile device to unlock the lock.

An employee may be identified and validated in the method 500 in a number of ways between various embodiments. In some embodiments, an employee may be validated based on a user identifier and a password. Similarly, a personal identification number may be used. In other embodiments, a biometric reading may be taken on the mobile device, such as a fingerprint, a retinal scan or facial recognition with imaging from a camera of the mobile device, and the like. Processing of the collected data for identity validation of the employee may be performed on the mobile device, on a server, or a combination thereof.

Regardless of how validated, the validation associates the employee with one or both of an employee identifier and an identifier of another unique identifier, such as a DID that identifies the employee within a blockchain embodiment. In some embodiments, the employee may be associated with both an employee identifier, such as may be assigned by a human resources management computing system or otherwise, the DID, or one of these identifiers may perform both identification functions in some embodiments.

The list of locks presented 502 by the mobile device app may be a listing of all secured storage bin locks stored on or retrieved from a remote location over the network. However, the listing of locks may be based on data retrieved based on the employee identifier to obtain a list of locks the employee is allowed to unlock. For example, there may be locked storage bins in both electronics and pharmacy departments of a store. An employee of one of these departments is likely only allowed to unlock the secured storage bin in their respective departments. Similarly, some secured storage bins may be accessible only when an employee is schedule for work. Thus, when the employee attempts to unlock a secured storage bin outside of hours a store is open or when the employee is not schedule to work, as may be defined in stored scheduling data accessible via the network, the presented 502 listing of locks is different than when the employee is scheduled to work and the store is open.

In some embodiments of the method 500, the mobile device app transmits 504 the unlock request to the backend server with the employee identifier, the DID, a lock identifier of the lock to be unlocked. In some embodiments, an encrypted private data item known only to the backend server and assigned to the mobile device app in association with the validated employee is also transmitted 504.

Figure 6:
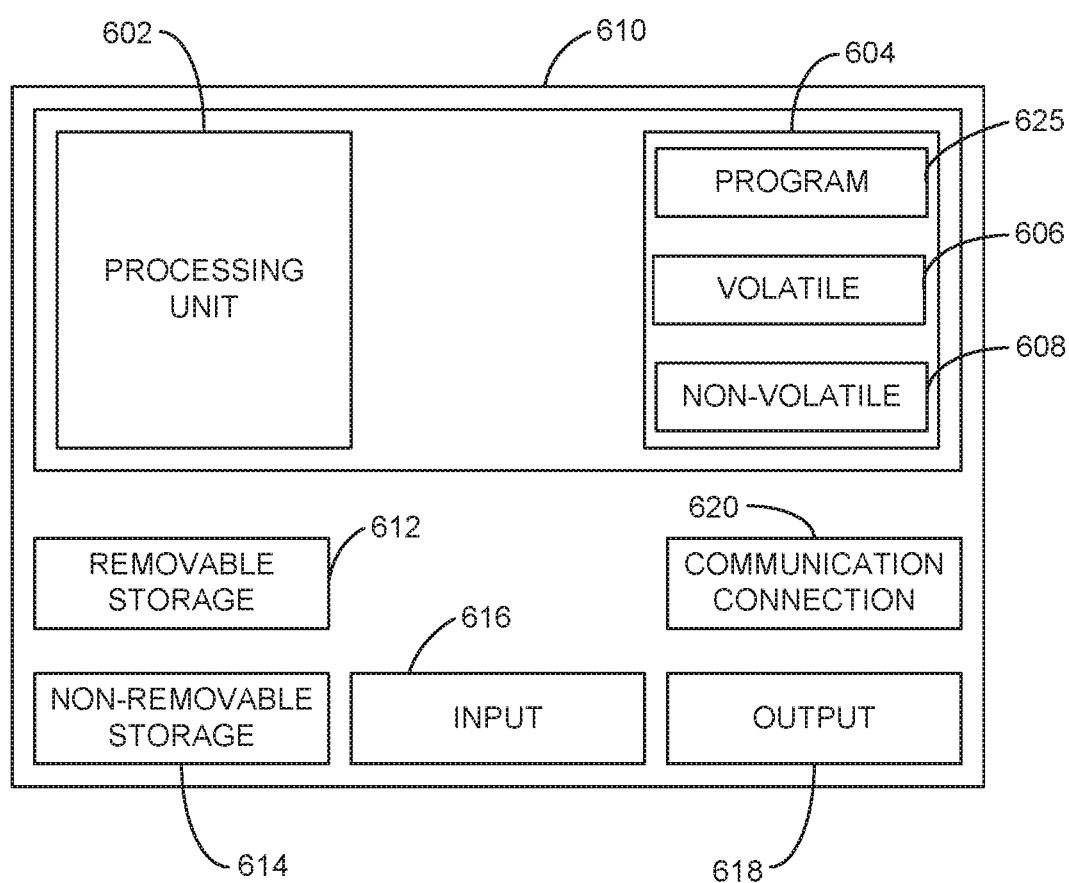
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies; compact disc read-only memory (CD ROM), Digital Versatile Disks (DVD) or other optical disk storage, magnetic cassettes, magnetic tape; magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers; and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices. For example, the communication connection 620 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, via a network at least in part from a mobile device app, an unlock request including an employee identifier, a lock identifier to unlock a secured resource of the lock identifier, a decentralized identifier (DID) of the mobile device app, the employee identifier, the lock identifier, and an encrypted private key;
   validating the employee identifier is authorized to unlock the lock of the lock identifier;
   retrieving a key-code that will unlock the lock of the lock identifier; and
   transmitting the key-code to enable unlocking of the lock of the lock identifier.

2. The method of claim 1, wherein the lock identifier corresponds to a lock on the secured resource, the lock including a radio device operable to wirelessly receive the key-code from a mobile device on which the mobile device app executes and unlock the secured resource upon validating the received key-code.

3. The method of claim 1, further comprising:
   retrieving the key-code only when the employee identifier is validated to unlock the lock of the identifier at a current date and time and:
     the DID is associated in with the employee identifier in stored data; and
     the private key is successfully decrypted.

4. The method of claim 1, upon receipt of the unlock request, further comprising:
   transmitting a representation of the request to an audit trail process; and
   receiving a token in response to the transmitted representation of the request to the audit trail process.

5. The method of claim 4, upon validating the employee identifier is authorized to unlock the lock of the lock identifier at a current date and time:
   transmitting a representation of the validation and the token to the audit trail process, the token associating the result of the validation to an audit trail entry of the unlock request.

6. The method of claim 4, wherein the audit trail process maintains a blockchain ledger.

7. The method of claim 6, wherein the representation of the request transmitted to the audit trail process is at least a portion of a block to be added to the blockchain ledger.

8. A method comprising:
   presenting, on a mobile device by a mobile device app, a listing of locks a validated employee is authorized to unlock;
   transmitting, via a network interface device of the mobile device to a backend process, an unlock request with regard to a lock of the locks the employee is authorized to unlock, the unlock request including an emplo Tee identifier, a decentralized identifier, a lock identifier of the lock to be unlocked, and an encrypted private data item known only to the backend server assigned to the mobile device app in association with the validated employee;
   receiving an unlock code for the lock; and
   transmitting the unlock code via a radio device of the mobile device to unlock the lock.

9. The method of claim 8, wherein the radio device of the mobile device is a BLUETOOTH® transceiver.

10. The method of claim 8, wherein the unlock request and a result of processing of the unlock request are written as block to a blockchain-enabled audit trail by the backend process.

11. A system comprising:
    a network interface device;
    a computer processor;
    a memory, storing instructions executable by the computer processor to perform data processing activities comprising:

receiving, over a network via the network interface device from a mobile device app, an unlock request including an employee identifier, a lock identifier to unlock a secured resource of the lock identifier, a decentralized identifier (DID) of the mobile device app, the employee identifier, the lock identifier, and an encrypted private key;

validating the employee identifier is authorized to unlock the lock of the lock identifier at a current date and time;

retrieving a key-code that will unlock the lock of the lock identifier; and transmitting the key-code to the mobile device app.

12. The system of claim 11, wherein validating the employee identifier is authorized to unlock the lock of the lock identifier at a current date and time is performed against stored employee data, permissions data, and schedule data.

13. The system of claim 11, wherein the lock identifier corresponds to a lock on the secured resource, the lock including a radio device operable to wirelessly receive the key-code from a mobile device on which the mobile device app executes and unlock the secured resource upon validating the received key-code.

14. The system of claim 11, wherein the unlock request includes a decentralized identifier (DID) of the mobile device app, the employee identifier, the lock identifier, and an encrypted private key, the data processing activities further comprising:

retrieving the key-code only when the employee identifier is validated to unlock the lock of the identifier at the current date and time and:
the DID as associated in with the employee identifier in a stored data; and
the private key is successfully decrypted.

15. The system of claim 11, wherein upon receipt of the unlock request, the data processing activities further comprising:

transmitting, via the network interface device over the network, a representation of the request to an audit trail process; and receiving a token in response to the transmitted representation of the request to the audit trail process.

16. The system of claim 15, wherein upon validating the employee identifier is authorized to unlock the lock of the lock identifier at a current date and time:

transmitting, via the network interface device over the network, a representation of the validation and the token to the audit trail process, the token associating the result of the validation to an audit trail entry of the unlock request.

17. The system of claim 15, wherein the audit trail process maintains a blockchain ledger.

18. The system of claim 17, wherein the representation of the request transmitted to the audit trail process is at least a portion of a block to be added to the blockchain ledger.

* * * * *